United States Patent

Robbins et al.

(10) Patent No.: US 10,088,686 B2
(45) Date of Patent: Oct. 2, 2018

(54) MEMS LASER SCANNER HAVING ENLARGED FOV

(71) Applicant: Microsoft Technology Licensing, LLC, Redmond, WA (US)

(72) Inventors: Steven John Robbins, Redmond, WA (US); Eliezer Glik, Seattle, WA (US); Sihui He, Bellevue, WA (US); Xinye Lou, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/382,471

(22) Filed: Dec. 16, 2016

(65) Prior Publication Data

US 2018/0172994 A1   Jun. 21, 2018

(51) Int. Cl.
| | |
|---|---|
| *G02B 27/01* | (2006.01) |
| *G02B 26/10* | (2006.01) |
| *G02B 26/08* | (2006.01) |
| *G02B 27/28* | (2006.01) |
| *G02B 27/42* | (2006.01) |
| *G02B 27/10* | (2006.01) |

(52) U.S. Cl.
CPC ..... *G02B 27/0172* (2013.01); *G02B 26/0833* (2013.01); *G02B 26/101* (2013.01); *G02B 27/1086* (2013.01); *G02B 27/283* (2013.01); *G02B 27/4227* (2013.01); *G02B 27/4261* (2013.01)

(58) Field of Classification Search
None
See application file for complete search history.

(56) References Cited

U.S. PATENT DOCUMENTS

| | | | |
|---|---|---|---|
| 7,233,710 | B2 | 6/2007 | Wang et al. |
| 8,233,204 | B1 | 7/2012 | Robbins et al. |
| 8,579,443 | B2 | 11/2013 | Hudman et al. |
| 8,933,862 | B2 | 1/2015 | Lapstun |
| 8,982,313 | B2 | 3/2015 | Escuti et al. |
| 9,116,350 | B2 | 8/2015 | Freedman et al. |
| 9,164,290 | B2 | 10/2015 | Robbins et al. |
| 2003/0007202 | A1 | 1/2003 | Moser et al. |
| 2003/0179998 | A1 | 9/2003 | Zhang et al. |

(Continued)

FOREIGN PATENT DOCUMENTS

| | | |
|---|---|---|
| JP | 2999953 B2 | 1/2000 |
| WO | 2013152205 A1 | 10/2013 |
| WO | 2014142967 A1 | 9/2014 |

OTHER PUBLICATIONS

Zhang, et al., "Wide-angle structured light with a scanning MEMS mirror in liquid", In Journal of Optics Express, vol. 24, Issue 4, Feb. 10, 2016, 9 pages.

(Continued)

*Primary Examiner* — Jennifer D. Carruth
(74) *Attorney, Agent, or Firm* — Arent Fox LLP

(57) ABSTRACT

A MEMS laser scanner is disclosed for use in a near-eye display including an increased field of view (FOV). In embodiments, one or more polarization gratings may be applied to the mirror of the MEMS laser scanner, which polarization gratings may be configured according to the Bragg regime. Using light of different polarizations, the MEMS laser scanner is able to expand the FOV without increasing the range over which the mirror of the scanner oscillates.

20 Claims, 15 Drawing Sheets

(56) References Cited

U.S. PATENT DOCUMENTS

2008/0042052 A1  2/2008  Sprague et al.
2013/0176621 A1  7/2013  Miller et al.
2014/0198366 A1  7/2014  Carminati et al.
2016/0033698 A1  2/2016  Escuti et al.
2016/0327906 A1* 11/2016 Futterer ............ G02F 1/133553

OTHER PUBLICATIONS

Milanović, et al., "High Brightness MEMS Mirror Based Head-Up Display (HUD) Modules with Wireless Data Streaming Capability", In Proceedings of SPIE Conference on MOEMS and Miniaturized Systems XIV, Feb. 11, 2015, 8 pages.

Milanović, et al., "Highly Adaptable Mems-Based Display with Wide Projection Angle", In Proceedings of IEEE 20th International Conference on Micro Electro Mechanical Systems, Jan. 21, 2007, 4 pages.

Lee, et al., "Optical design for uniform scanning in MEMS-based 3D imaging lidar", In Journal of Applied Optics vol. 54, Issue 9, Mar. 20, 2015, pp. 2219-2223.

Reck, et al., "MEMS Bragg grating force sensor", In Journal of Optics Express, vol. 19, No. 20, Sep. 19, 2011, pp. 19190-19198.

Naftali, Matan, "MEMS Journal—Mems Based Optical Engine Platforms: Market and Technology Overview", Published on Feb. 28, 2013 Available at: http://www.memsjournal.com/2013/02/mems-based-optical-engine-platforms-market-and-technology-overview.html.

"International Search Report and Written Opinion Issued in PCT Application No. PCT/US2017/065496", dated Apr. 5, 2018, 18 pages.

* cited by examiner

MEMS LASER SCANNER HAVING ENLARGED FOV

BACKGROUND

Various types of computing, entertainment, and/or mobile devices can be implemented with a near-eye transparent or semi-transparent display. Near-eye displays may include a transparent or semi-transparent display through which a user may view the surrounding environment, and also see images of virtual objects (e.g., text, graphics, video, etc.) that are generated on the display to appear as a part of, and/or overlaid upon, the surrounding environment.

Near-eye displays have conventionally been implemented using spatial light modulation (SLM) systems including for example liquid crystal on silicon (LCoS) display engines and digital light processing (DLP) display engines for generating an image. LCoS and DLP display systems project all pixels in an image simultaneously, modulating the amplitude, phase, intensity or polarization of light across the image. Another emerging technology is microelectromechanical (MEMS) laser scanners. MEMS laser scanners conventionally include a laser light source including for example red, green and blue laser diodes directing RGB laser light to a MEMS mirror capable of deflection about two orthogonal axes.

In contrast to LCoS and DLP displays, MEMS laser scanners typically generate a two-dimensional raster scan image pixel by pixel for each image frame. The laser light source is synchronized with the bi-axial MEMS mirror drivers so that bi-axial deflection of the MEMS mirror directs laser light from the light source to the respective pixels in the raster scan, as the RGB laser light for each pixel is modulated to thus generate the desired light content of each pixel in the image.

The bi-axial range of motion of the MEMS mirror in a near-eye display laser scanner establishes the size of the field of view (FOV) that the laser scanner can generate. However, various factors impede the pivoting range of motion of a MEMS mirror during the scanning of an image frame. These factors include for example the mass of the MEMS mirror, as well as the opposing forces of air (or other gas) against the mirror surface as it pivots. Currently, MEMS mirrors in near-eye display laser scanners commonly achieve a range of motion of about 30 degrees, and an FOV of about 35 degrees.

SUMMARY

Certain embodiments of the present technology relate to a MEMS laser scanner for use in a near-eye display including an increased field of view (FOV). In embodiments, one or more polarization gratings may be applied to the mirror of the MEMS laser scanner, which polarization gratings may be configured according to the Bragg regime.

The one or more polarization gratings diffract polarized light from a laser image source in two different directions, depending on the polarization of the light, according to a time-division multiplexed scheme. The MEMS scanner pivots back and forth through its range of motion about an axis to complete one full stroke. During the time that the MEMS scanner pivots about an axis through a first half of its stroke, the laser image light may be polarized for example as LHC polarized light. The one or more polarization gratings may be tuned to allow a zero order of the LHC polarized light to pass straight through the grating un-diffracted and reflect off the MEMS mirror at an angle equal to the angle of incidence. As the MEMS scanner pivots through its first half stroke, the un-diffracted zero order light traces out a first portion of the FOV.

During the time that the MEMS scanner pivots about the axis through a second half of its stroke, the laser light may be polarized for example as RHC polarized light. The one or more polarization gratings may be tuned to diffract a first order of the RHC polarized light in reflection off the MEMS scanner at some angle greater than the mirror angle. As the MEMS scanner pivots through its range of motion, the diffracted first order light traces out a second portion of the FOV. The first and second portions of the FOV may overlap and combine to provide an enlarged overall FOV.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
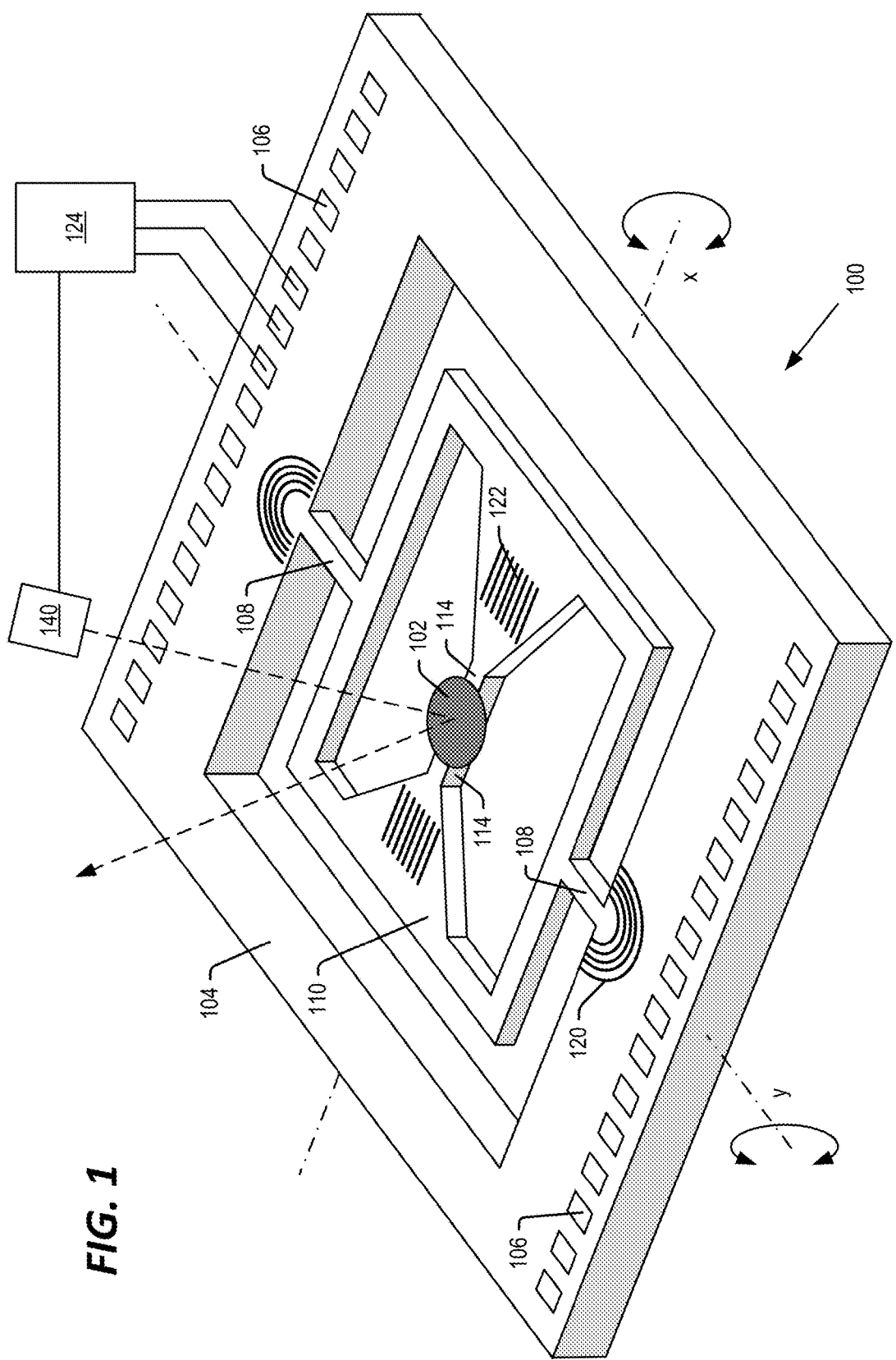
FIG. 1 is a perspective view of a beam scanning assembly according to embodiments of the present technology.

Certain embodiments of the present technology can be used to increase (also referred to as expand) the FOV that can be supported by a MEMS laser scanner used for example in a near-eye display. In embodiments, the MEMS laser scanner includes a display engine comprised of a plurality of laser diodes, for example emitting light in the red, green and blue (RGB) wavelengths. The light from the display engine is directed onto an optical element of a beam scanning assembly. In one embodiment, the optical element may be a reflective mirror.

The optical element is supported by flexures to pivot about two axes, referred to herein as x and y axes, which in embodiments may be co-planar and orthogonal to each other. The beam scanning assembly further includes bi-axial drivers which pivot the optical element about the axes. The bi-axial drivers and laser diodes may be coupled to a controller which coordinates the firing of the respective RGB lasers with the x,y positioning of the optical element by the bi-axial drivers to trace out the pixels of an image in the FOV.

As the optical element pivots about one of the axes, for example the x-axis, through a first period of its cycle, it may receive light from the display engine which is polarized in a first orientation, for example left-handed circular (LHC) polarization. As the optical element pivots about the axis through a second period of its cycle, it may receive light from the display engine which is polarized in a second orientation, for example right-handed circular (RHC) polarization.

In accordance with aspects of the present technology, one or more polarization gratings may be mounted on or above the optical element, which polarization gratings may be configured according to the Bragg regime. Such gratings are referred to herein as Bragg polarization gratings, or more simply, as BPGs. The one or more BPGs on the optical element cause a maximized order of light of different polarizations to diffract or otherwise propagate through the one or more BPGs in different directions.

Thus, light for a first portion of an overall image may be directed to the one or more BPGs on the optical element with a first polarization (e.g., LHC polarization). This light will leave the optical element in a first direction to trace out a first portion of the overall FOV. Light for a second portion of the overall image may be directed to the one or more BPGs on the optical element with a second polarization (e.g., RHC polarization). This light will leave the optical element in a second direction to trace out a second portion of the overall FOV. By time-division multiplexing of the image light between the LHC and RHC polarized light, synchronized with the optical element as it pivots, the first and second portions of the FOV may combine to provide an enlarged overall FOV.

In embodiments, the MEMS laser scanner described herein can be used in a near-eye display, such as for example a head mounted display (HMD) device used in augmented and virtual reality environments. However, it is understood that the present technology may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top" and "bottom," "upper" and "lower," "vertical" and "horizontal," and "left" and "right," and forms thereof, as may be used herein are by way of example and illustrative purposes only, and are not meant to limit the description of the invention inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±0.25%.

FIG. 1 shows a generalized drawing of a beam scanning assembly 100 for use in a MEMS laser scanner in accordance with aspects of the present technology. The beam scanning assembly 100 includes an optical element 102, which in embodiments may be a mirror formed of any suitable specular reflector for reflecting light. The reflective surface of the optical element may be planar, but it is conceivable that it have a convex or concave contour in further embodiments. In still further embodiments explained below, the optical element 102 may instead comprise a transmissive substrate for transmitting light. Whether reflective or transmissive, the optical element may also have one or more BPGs on one of its surfaces in accordance with aspects of the present technology as explained below.

The structures for supporting and driving the optical element 102 to pivot about x- and y-axes as shown may be known in the art. By way of example only, such structures are shown and described in U.S. Pat. No. 7,515,329, entitled, "Driving a MEMS Scanner with a Combined Actuator Drive Signal," and U.S. Patent Application Publication No. 2007/0053044, entitled "Electrostatic Drive Type MEMS Mirror Scanner."

However, in general, the beam scanning assembly 100 may be photolithographically formed in silicon using MEMS micromachining and semiconductor fabrication techniques as is known to the art. The silicon may be fabricated to include an outer frame 104 having electrical contacts 106. The number and arrangement of electrical contacts 106 is shown by way of example only, and may vary in further embodiments. The silicon may be etched or otherwise photolithographically developed to define a first pair of flexures 108 enabling pivoting of an inner frame 110 about the y-axis with respect to the outer frame 104. The silicon may also be etched or otherwise photolithographically developed to define a second pair of flexures 114 enabling pivoting of the optical element 102 about the x-axis with respect to the inner frame 110. The flexures 108, 114 are shown by way of example only and may have different structures in further embodiments.

FIG. 1 further shows first and second drive actuators 120 and 122 (shown symbolically in FIG. 1), operatively coupled to controller 124. The controller 124 may be integrated within the beam scanning assembly 100, or may be electrically connected to the beam scanning assembly 100. FIG. 1 shows the controller 124 schematically connected via some of the contacts 106, but it is understood that the beam scanning assembly 100 may be electrically coupled to the controller 124 by a variety of other means in further embodiments.

The first and second drive actuators 120, 122 are configured to deflect the optical element 102 about the y and x rotational axes, respectively. In the embodiments illustrated herein, a single optical element 102 situated on a dual-axis mount is deflected about orthogonal rotational axes. In other embodiments, the same effect can be achieved using two optical elements 102 arranged in series, each optical element 102 situated on a single-axis mount.

The first and second drive actuators 120, 122 may operate according to a variety of technologies to cause pivoting of the optical element 102 at the flexures 108, 114. For example, the drive actuators 120 and/or 122 may for example be piezoelectric, electromagnetic, or electrostatic transducers. The first and second drive actuators, respectively, may be driven by the same technology, or different technologies. Controller 124 is configured to apply a drive signal (voltage or current) to each of the drive actuators to thereby provide the desired deflection of optical element 102 about the x- and y-axes. In one embodiment, one or both drive actuators may be electrostatic transducers that impart a deflective force to the optical element 102 when a voltage is applied across closely-spaced plates or combs. Electrostatic transducers can be manufactured using standard MEMS processing.

Figure 2:
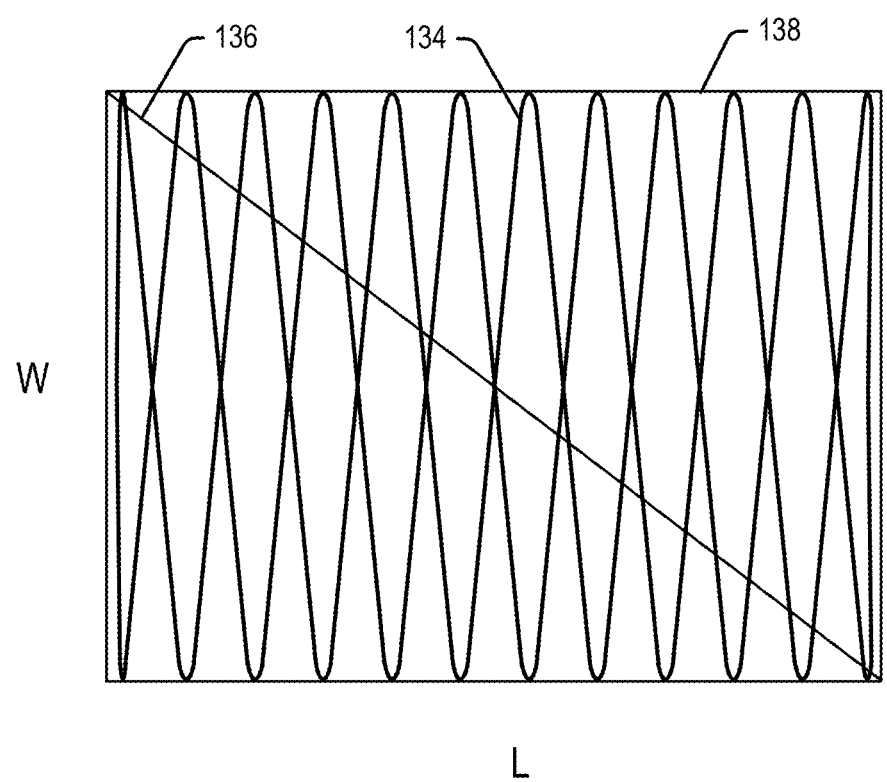
FIG. 2 is a view of a sample Lissajous pattern which may be produced by light reflected off of the bi-axial optical element of the beam scanning assembly of FIG. 1.

As explained in greater detail below, the MEMS laser scanner further includes a display engine 140 including, for example, red, green and blue laser diodes for emitting image laser light toward the optical element 102. The projected image FOV is created by modulating the three lasers synchronously with the position of the scanned beam. In particular, one of the drive actuators, for example drive actuator 120, may drive at a high frequency, and the other drive actuator, for example drive actuator 122, may drive at a lower frequency. The result is that light may be reflected off of the oscillating optical element in a Lissajous pattern 134, an example of which is shown in FIG. 2. The pattern 134 is conceptually illustrative, and the oscillating optical element 102 may trace out a much higher-order Lissajous pattern for suitably high resolution.

In the example shown, the high frequency drive actuator 120 oscillates the optical element in the y-direction more quickly than the low frequency drive actuator 122 oscillates the optical element in the x-direction. Thus, the optical element generates a raster-like image such that every virtual pixel of the image is hit at least once within the time of one image frame. In one embodiment, the optical element may complete a frame (e.g., a full period of oscillation in both the x- and y-directions) 60 times per second. The frame rate may be higher or lower than 60 frames per second in further embodiments.

Under the control and coordination of the controller 124, the position of the optical element 102 is synchronized with the modulation of the red, green and blue lasers, such that, each pixel receives the proper combination of color within the image, and a desired image is created each image frame. If one of the colors is not needed due to the image content, its associated laser may be down-modulated, which minimizes power consumption.

When the MEMS laser scanner of the present technology is used for example in a near-eye display device, image light reflected or transmitted by the oscillating optical element 102 presents the image with a certain FOV to an eye of a user at an output pupil of the scanner. Referring to FIG. 2, in conventional MEMS laser scanners, the extent to which the optical element is oscillated about the x- and y-axes defines the length, L, and width, W, components of the FOV 136 at an output-pupil 138. The FOV may be measured as the diagonal or area of the scanned image, though it may be measured other ways in further embodiments. As explained below, the present technology provides for a larger overall FOV 136 at the output-pupil for given x- and y-axes oscillation of the optical element 102, or even a smaller x-axis and/or y-axis oscillation of the optical element 102.

Figure 3A:
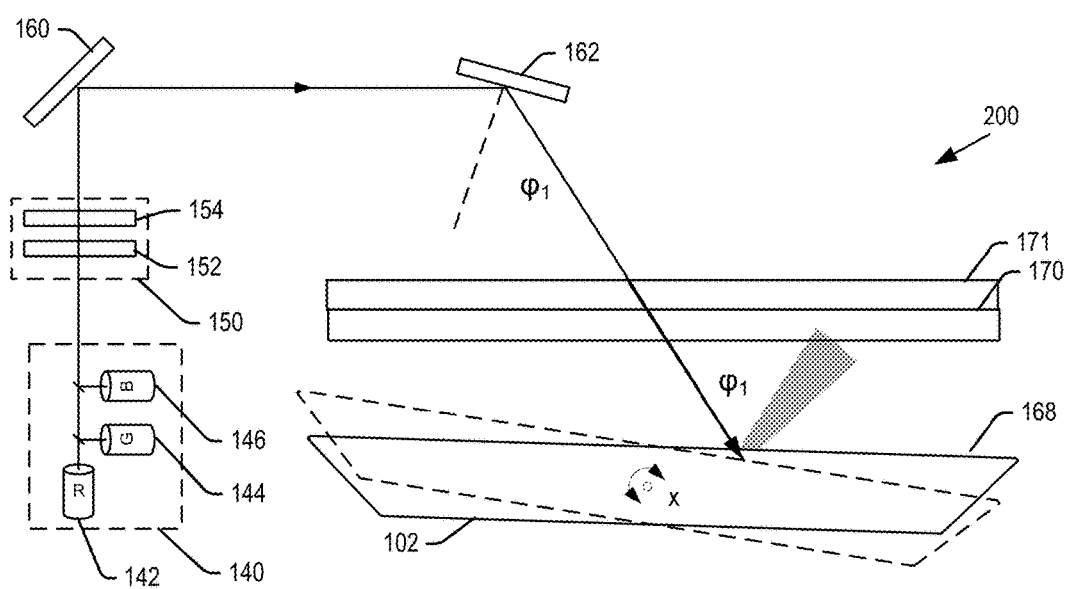
FIGS. 3a and 3b are views of a first embodiment of a MEMS laser scanner receiving polarized light at a time t1.
Figure 3B:
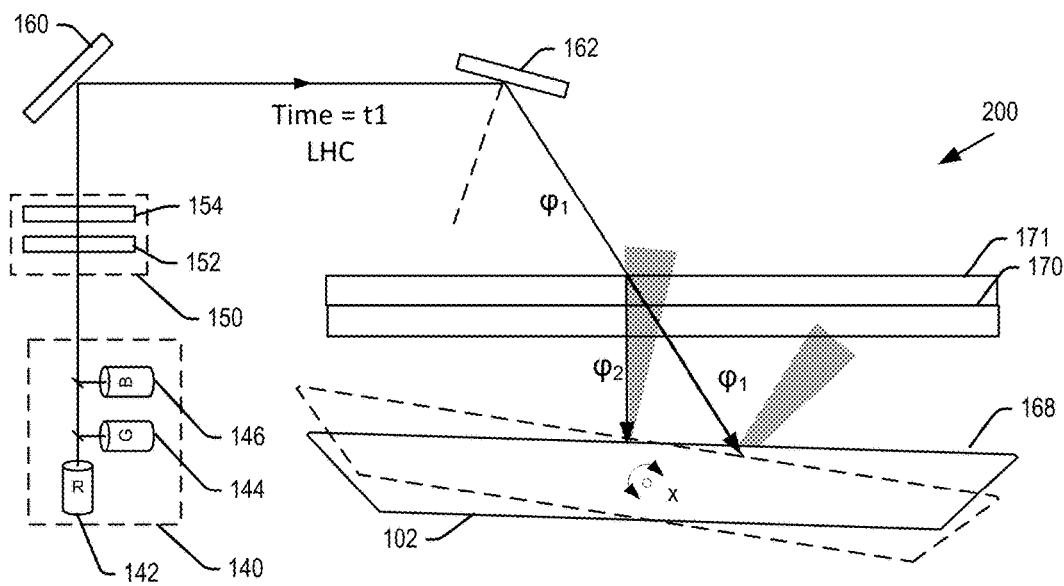
Figure 3C:
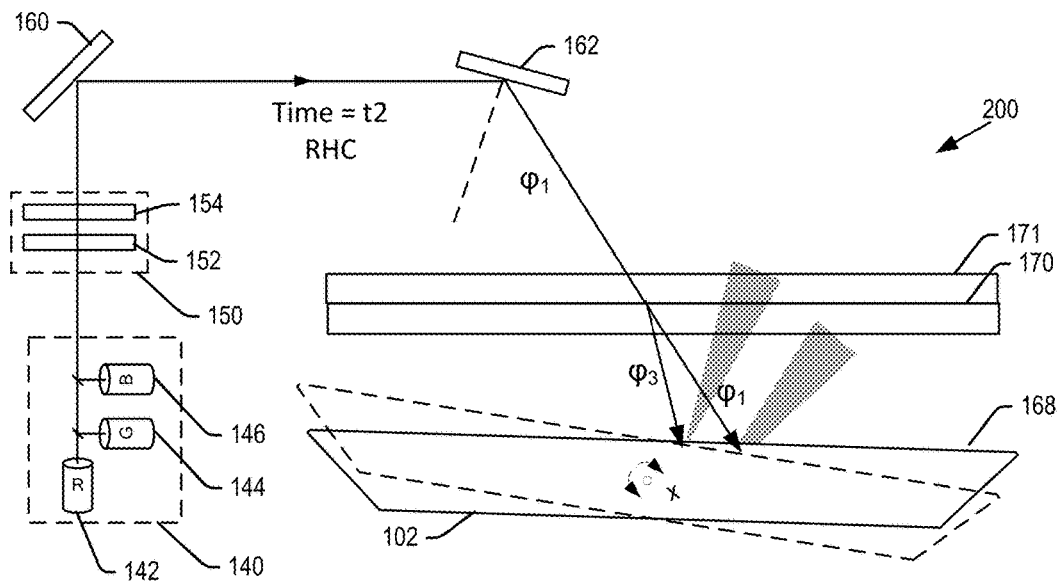
FIG. 3c is a view of a first embodiment of a MEMS laser scanner receiving polarized light at a time t2.

Embodiments of the present technology using the beam scanning assembly 100 described above will now be described with reference to the views of FIGS. 3-15 and the flowchart of FIG. 16. FIGS. 3a, 3b and 3c illustrate a structure and operation of a first embodiment of the MEMS laser scanner 200 according to the present technology. FIG. 3a shows image light incident on the optical element 102 at two different times. This figure illustrates the zero order diffracted light present since the diffraction gratings are not 100% efficient. This light does not contribute to the final image and would appear as a ghost so therefore some mechanism like a blocking aperture would be used to block the light from reaching the subsequent components in the optical system. FIGS. 3b and 3c show image light incident on the optical element 102 at two different times. These figures illustrate the formation of two separate fields of view by diffracting the display light onto the MEMS mirror 168 by two separate Bragg polarization gratings 170 and 171 as explained below. The image light is generated by a display engine 140 which emits image light in a step 300 that is modulated on a pixel-by-pixel basis by the controller 124. In embodiments, the display engine 140 may be a commercially available assembly, such as for example the PicoP™ display engine from Microvision, Inc. of Redmond, Wash.

However, in general, the display engine 140 may include three laser diodes comprised of a red laser diode 142, a green laser diode 144 and a blue laser diode 146, though there may be greater or fewer laser diodes in further embodiments. Additionally, in further embodiments one or more of the laser diodes may emit light in the non-visible spectrum, such as for example infrared light. The RGB laser diodes 142, 144 and 146 may each be operatively coupled to the controller 124. The controller may be configured to modulate the intensity of the illumination beam from each of the RGB laser diodes, for each pixel, by controlling the current or voltage applied to the respective laser diodes. The laser intensity for the respective diodes may be modulated by other means in further embodiments. The light from the three laser diodes may be combined using dichroic or other optics into a single white beam emitted by the display engine 140.

Laser light emitted from the display engine 140 may pass through a light polarization assembly 150. The polarization engine 150 is provided for polarizing the light from the display engine into light having first and second different polarizations, according to a time-division multiplexed scheme. The light polarization assembly 150 may include a fast polarization modulator (FPM) 152 and a chromatic quarter-waveplate 154. FPM 152 may be an LC-based polarization modulator/rotator that controls light polarization by an externally applied drive voltage. Thus, in step 302, the light from the display engine 140 may be linearly polarized with no moving parts, without vibration and in a device having a small footprint. An FPM 152 for use with the present technology is available for example from LC-TEC Displays AB, Borlange, Sweden.

The FPM 152 also achieves time-division multiplexed switching back and forth between two orthogonal linear polarization states at a desired switch rate. The switch rate is synchronized to the oscillation of the optical element 102 about the x-axis or y-axis by the controller 134 as explained below. In embodiments, the FPM may switch the polarization state of received light once per frame, though it may be more or less frequent than that. As noted, in embodiments, the display engine 140 may generate frames at a rate of 60 frames per second, though it may be faster or slower than that in further embodiments.

In step 306, the quarter-waveplate 154 converts the linear polarization from the FPM 152 to circular polarization of its corresponding handedness, namely left-handed circular (LHC) or right-handed circular (RHC). The quarter-waveplate cycles between generating RHC polarized light and LHC polarized light, based on the linear polarization received from the FPM 152. A quarter-waveplate 154 for use with the present technology is available for example from Thorlabs, Inc., Newton, N.J. It is understood that the polarization assembly 150 may include other or alternative components for generating time-division multiplexed switching between LHC and RHC polarized image light.

Polarized image light from the polarization engine 150 is then directed onto the optical element 102 of the beam scanning assembly 100 to form the FOV at the output pupil in steps 310-316 explained below. FIGS. 3a-3c, 4a-4c, 6a-c show the optical element 102, with other components of the beam scanning assembly 100 omitted for clarity. FIGS. 3a-3c, 4a-4c, 6a-c also show side views of the optical element, at distinct instants in time, rotating about the x-axis (the x-axis is aligned into and out of the page of the figures). Rotation about the y-axis is discussed below, but is not indicated in FIGS. 3a-3c, 4a-4c, 6a-c.

FIGS. 3a-3c show a pair of optical components 160, 162 for directing the polarized image light onto the optical element 102. The optical components may be mirrors. However, it is understood that a wide variety of optical components may be used to direct the polarized image light from the display engine 140 onto the optical element 102, including for example beam splitters, prisms and folding mirrors, which components may possibly include diffractive gratings. For example, optical component 162 deflects image light coming from the display engine down onto the optical element 102. However, where the optical element 102 is perpendicular to the incoming image light, that light will reflect back up toward the optical component 162. Such reflected image light should pass straight through the optical component 162 unaffected so as not to disrupt the image light forming the FOV at the output-pupil.

In accordance with aspects of the present technology, two or more Bragg polarization gratings 170 and 171, also referred to herein as BPGs 170 and 171, may be provided above or on a major planar surface 168 of the optical element 102. The thicknesses of the BPG 170 and 171 and optical element 102 shown for example in FIGS. 3a-3c, 4a-4c, 6-7 and 9-12 may not be drawn to scale with respect to each other. Details of the fabrication and operation of different embodiments of the one or more Bragg polarization gratings 170 and 171 are described for example in the various embodiments of U.S. Published Patent No. 2016/0033698, entitled, "Bragg Liquid Crystal Polarization Gratings," to Escuti et al. However, in general, in the field of diffraction gratings, a dimensionless parameter Q may be used to define a regime of optical behavior of a particular grating configuration, such that:

$$Q = 2\pi\lambda d / \Lambda^2 n,  \quad (1)$$

where $\lambda$ is the vacuum wavelength of light, d is the grating thickness, $\Lambda$ is the grating period of the optical element (i.e., pitch), and n is the average refractive index of the medium through which the light travels. In this framework, the Bragg regime can be defined as Q>1, the RamanNath regime can be defined as Q<1, and Q=1 may refer to a mixed regime with properties of both.

In embodiments of the present technology, the one or more polarization gratings used on the optical element 102 may be formed for example with liquid crystal materials having a grating period $\Lambda$, thickness d, and/or average refractive index n that are selected such that the Bragg condition (Q>1) is attained for the wavelengths of light that the system uses. Each of the above parameters may be selected to tune the BPGs 170 and 171 to provide light propagation in accordance with aspects of the present technology, including but not limited to high diffraction efficiency, limited diffraction orders, and/or polarization selectivity. These features are explained in greater detail below.

Figure 5:
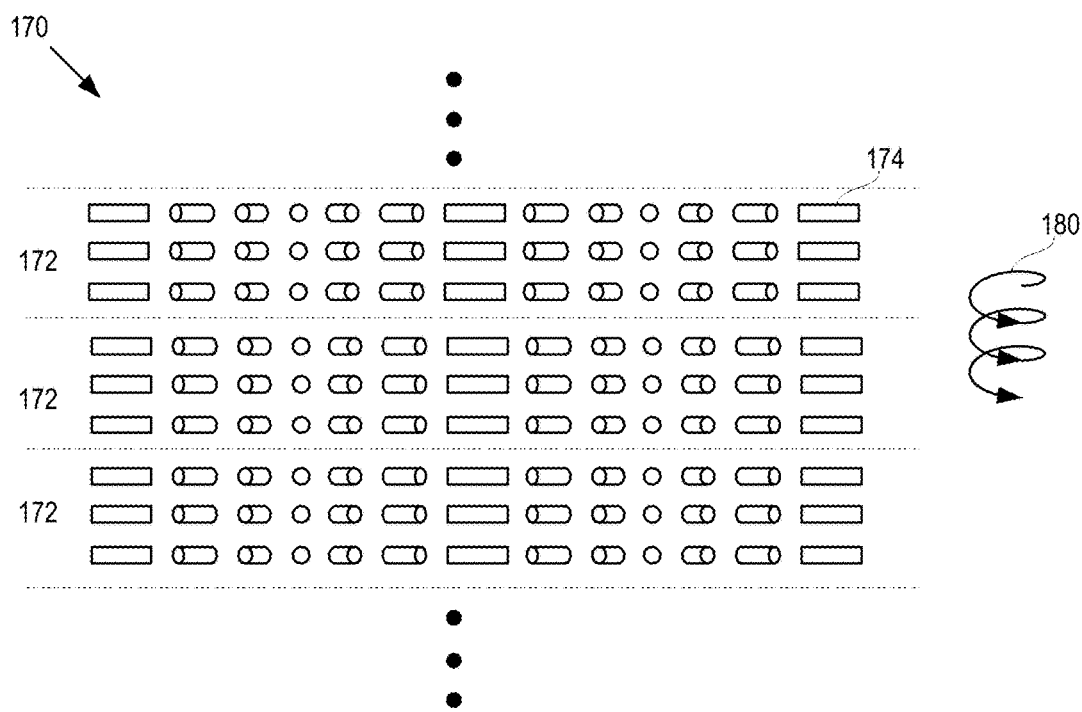
FIG. 5 is a magnified view showing liquid crystal molecular orientation within a Bragg polarization grating for use in the first embodiment of the present technology.

FIG. 5 is a magnified view of an example of a BPG 170 and 171 including a plurality of sub-layers 172 having liquid crystal molecules 174 (one of which is numbered). As noted in Published Patent No. 2016/0033698 to Escuti, the sub-layers 172 may be multiple, stacked polymerized nematic liquid crystal sub-layers formed by patterning thin films with optical anisotropy. In particular, the liquid crystal sub-layers 172 may have local optical axes, which may be defined by liquid crystal molecule 174 orientations that are aligned through a thickness of the sub-layers and across interfaces between the sub-layers.

It is a property of certain Bragg polarization gratings that they have a high coupling efficiency for light having a preferential polarization orientation. In the embodiment of FIG. 5, the BPG 170 may have a high coupling efficiency for a minus one order of light of a first polarization (e.g., LHC), and the BPG 172 may have a high coupling efficiency for a plus one order of light of a second polarization (e.g., RHC).

For example, in FIG. 5, the liquid crystal molecules may be formed so as to have a right-handed twist helix 180. This allows RHC polarized light to couple within the sub-layers 172 and diffract in a first order diffraction as explained below, with other orders of the RHC polarized light being minimized. Conversely, LHC polarized light may pass straight through the sub-layers 172 unaffected. The particular molecular orientations shown in FIG. 5 are by way of example only, and may vary in further embodiments. In one further example explained below, the liquid crystal molecules may alternatively be formed so as to have a left-handed twist helix. Such a configuration would diffract a first order of the LHC polarized light, while allowing RHC polarized light to pass straight through the BPG 170 unaffected.

Embodiments described herein include a Bragg polarization grating on the optical element for directing a maximized order of light in two different directions, depending on the polarization of the light. However, it is understood that other gratings may be used that exhibit a high coupling efficiency for light having a preferential polarization orientation. One such additional grating which may be used is a switchable Bragg grating. Such switchable Bragg gratings are known and described for example in U.S. Pat. No. 7,265,882 entitled "Switchable Polymer-Dispersed Liquid Crystal Optical Elements."

FIG. 3a shows light polarized as LHC or RHC light striking the optical element 102 as the optical element pivots about the x-axis. In this diagram, two BPGs 170, 171 are mounted between the optical element 102 and component 162 so that light from the display engine 140 passes through the stationary BPGs 170, 172. The forward beam travels through the BPGs unaffected for a certain portion of the light. This is the zero order diffraction mode and exists because the diffraction efficiency of the BPGs is not 100%. The figure ignores refraction at the air-glass interfaces of 170 to simplify the diagram. The light is incident on the BPG 170 and optical element 102 at some arbitrary angle of incidence, $\varphi_1$, relative to a vector normal to the surfaces of BPG 170 and the surface 168 of optical element 102 (referred to herein as the normal vector). The light specularly reflects off of the optical element 102 at the same angle $\varphi_1$ relative to the normal vector as the angle of incidence. The reflected light passes through the BPG 170 unaffected since the direction of the light is outside the angular range of the BPG. This light represents a potential ghost path of unwanted light and should be dumped by for example using an aperture blocking the path while passing display light through.

FIG. 3b shows light polarized as RHC light striking the optical element 102 at some time t1, as the optical element pivots about the x-axis. In this embodiment, the BPG 170 is sensitive to RHC polarized light so that a first order of the RHC polarized light is diffracted as it passes through the BPG 170. The light is incident on the BPG 170 at the same arbitrary angle of incidence, $\varphi_1$, relative to the normal vector, and is diffracted to an angle, $\varphi_2$, relative to the normal vector. The light specularly reflects off of the optical element 102 at the same angle $\varphi_2$ as the angle of diffraction. The reflected light passes through the BPG 170 to form a first portion of the image at the output-pupil as explained below.

FIG. 3c shows light polarized as LHC light striking the optical element 102 at some time t2, as the optical element pivots about the x-axis. In this embodiment, the BPG 170 is sensitive to LHC polarized light so that a first order of the LHC polarized light is diffracted as it passes through the BPG 170. The light is incident on the BPG 170 at the same arbitrary angle of incidence, $\varphi_1$, relative to the normal vector, and is diffracted to an angle, $\varphi_3$, relative to the normal vector. The light specularly reflects off of the optical element 102 at the same angle $\varphi_3$ as the angle of diffraction. The reflected light passes through the BPG 170 to form a second portion of the image at the output-pupil as explained below.

In embodiments, the desired diffraction angle $\varphi_2$ of the diffracted +1 order of light shown in FIG. 3b may be accomplished by controlled selection of the grating thickness(es) of the one or more BPGs, BPG period and refractive index of the one or more BPGs. In further embodiments, the properties of light diffracted through the one or more BPGs 170 may be advantageously controlled by providing a chiral slant to the liquid crystal molecules 174 through a thickness of the sub-layers and across interfaces between the sub-layers. Chiral slanting of liquid crystal molecules is discussed in the above-mentioned Published Patent No. 2016/0033698 to Escuti.

In the embodiments described above, the one or more BPGs 170 allow a maximized minus one order of the LHC polarized light to diffract a maximized first order at a first time, and diffract a maximized plus one order of the RHC polarized light at a second time.

Figure 4A:
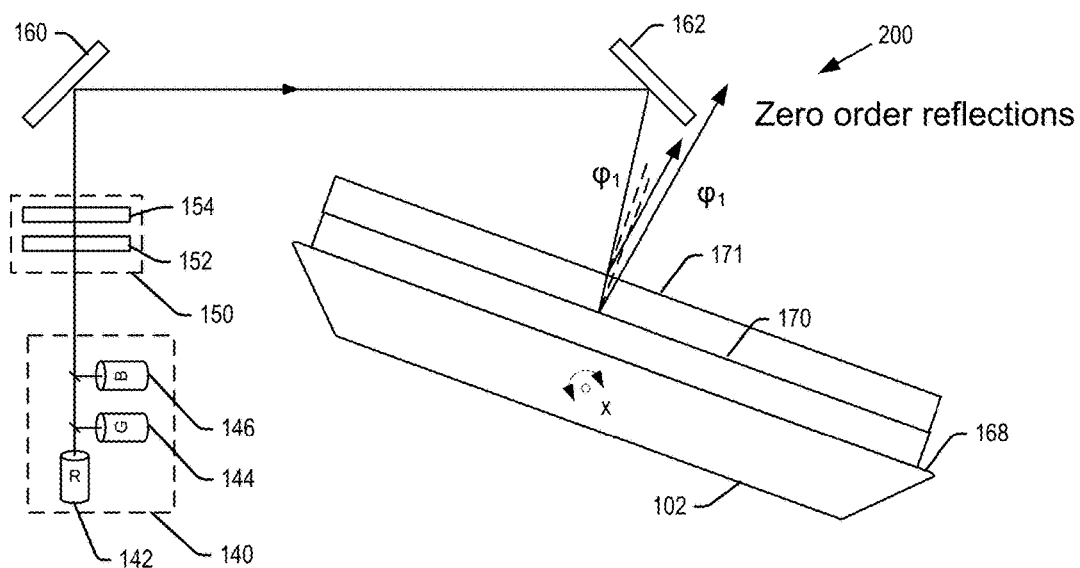
FIG. 4a is a view of a second embodiment of a MEMS Laser scanner showing zero order reflections from the first and second Bragg polarization grating.

FIG. 4a shows light polarized as LHC or RHC light striking the optical element 102 as the optical element pivots about the x-axis. In this diagram, the BPGs 170, 172 are mounted on and pivot with the planar surface 168 of the optical element 102. The forward beam reflects off the BPG unaffected by diffraction for a certain portion of the light. This is the zero order diffraction mode and exists because the diffraction efficiency of the BPG is not 100%. The figure ignores refraction at the air-glass interfaces of 170 to simplify the diagram. The light is incident on the BPG 170 and optical element 102 at some arbitrary angle of incidence, $\varphi_1$, relative to a vector normal to the surfaces of BPG 170 and the surface 168 of optical element 102 (referred to herein as the normal vector). In this embodiment, surface 168 is a beam dump in that it is coated with a light absorbing material. The zero order reflected light passes through the BPG 170 unaffected since the direction of the light is outside the angular range of the BPG. This light represents a potential ghost path of unwanted light and should be dumped by for example using an aperture blocking the path while passing display light through.

Figure 4B:
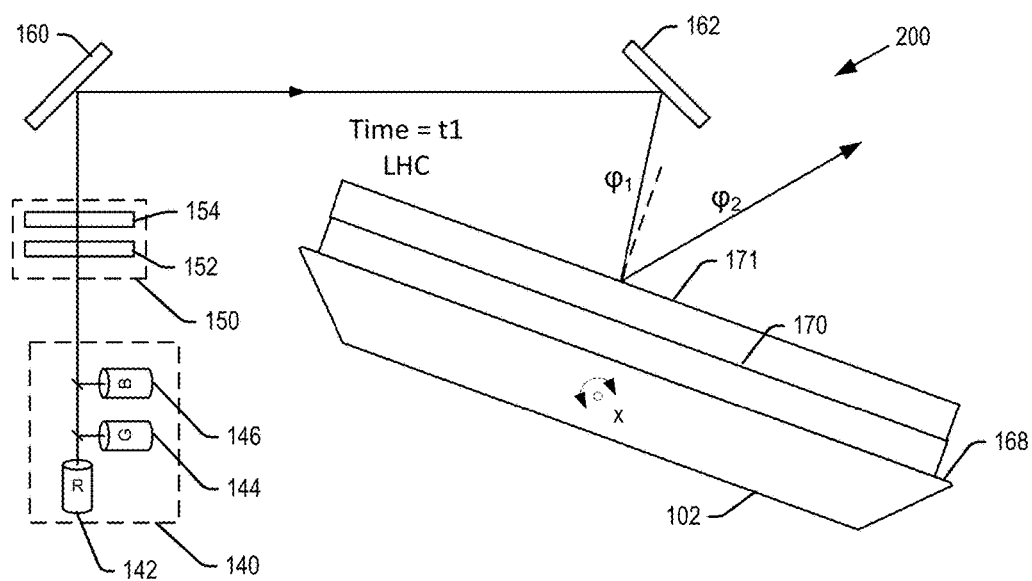
FIG. 4b is a view of a second embodiment of a MEMS laser scanner receiving polarized light at a time t1.

FIG. 4b shows light polarized as RHC light striking the optical element 102 at some time t1, as the optical element pivots about the x-axis. In this embodiment, the BPG 170 is sensitive to RHC polarized light so that a first order of the RHC polarized light is diffracted. The light is incident on the BPG 170 at the same arbitrary angle of incidence, $\varphi_1$, relative to the normal vector, and is diffracted to an angle, $\varphi_2$, relative to the normal vector. The diffracted light will form a first portion of the image at the output-pupil as explained below.

Figure 4C:
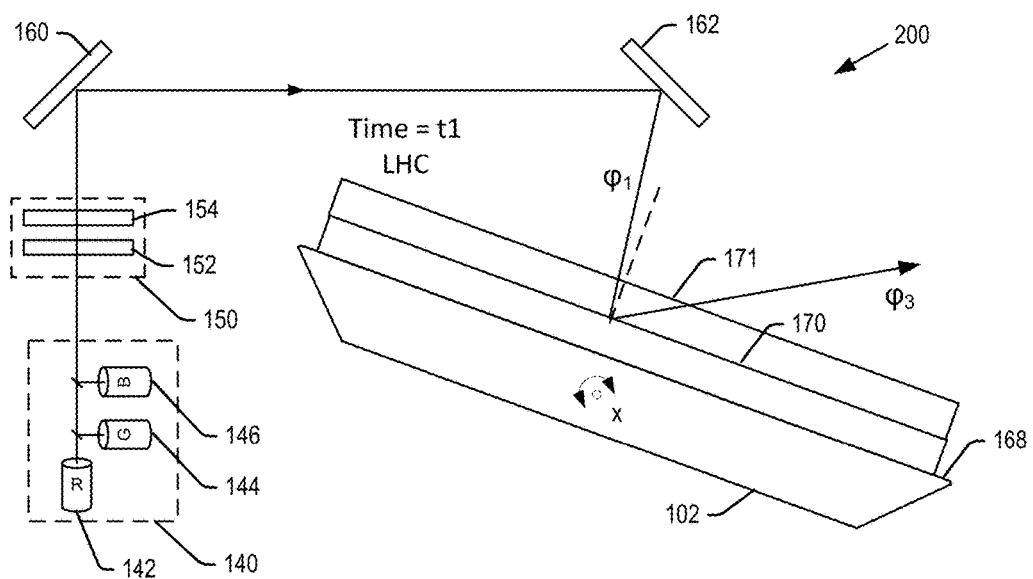
FIG. 4c is a view of a second embodiment of a MEMS laser scanner receiving polarized light at a time t2.

FIG. 4c shows light polarized as LHC light striking the optical element 102 at some time t2, as the optical element pivots about the x-axis. In this embodiment, the BPG 170 is sensitive to LHC polarized light so that a first order of the LHC polarized light is diffracted. The light is incident on the BPG 170 at the same arbitrary angle of incidence, $\varphi_1$, relative to the normal vector, and is diffracted to an angle, $\varphi_3$, relative to the normal vector. The diffracted light will form a second portion of the image at the output-pupil as explained below.

In embodiments, the desired diffraction angle $\varphi_2$ and $\varphi_3$ of the diffracted ±1 order of light shown in FIG. 3b-4c may be accomplished by controlled selection of the grating thickness(es) of the one or more BPGs, BPG period and refractive index of the one or more BPGs. In further embodiments, the properties of light diffracted through the one or more BPGs 170 may be advantageously controlled by providing a chiral slant to the liquid crystal molecules 174 through a thickness of the sub-layers and across interfaces between the sub-layers. Chiral slanting of liquid crystal molecules is discussed in the above-mentioned Published Patent No. 2016/0033698 to Escuti.

In the embodiments described above, the one or more BPGs 170 allow incident light of the LHC polarized light to diffract to a maximized minus one order, and diffract a maximized plus one order of the RHC polarized light.

In embodiment of FIGS. 3a-3c described above, optical element 102 is a reflective mirror having one or more BPGs 170 above the surface 168. In embodiments 4a-4c described above, optical element 102 has one or more BPGs 170 that are reflective diffraction gratings. However, in further embodiments, the optical element may instead be a transmissive substrate having one or more BPGs 170 on the surface 168. Such an embodiment will now be described with reference to the side views of FIGS. 6a-6c. In further embodiments using a transmissive substrate, the one or more BPGs 170 may alternatively or additionally be provided on a second major planar surface 166 of the optical element 102, opposite and parallel to the first major planar surface 168.

In the transmissive embodiment, the optical element 102 may be a substrate made of glass or optical plastic, but is not limited thereto. In embodiments, the substrate may be a bulk substrate, though it need not be. A bulk substrate is an optical substrate where the thickness of the substrate (between its major surfaces) is at least ten times (i.e., 10×) the wavelength of the light for which the substrate is being used as an optical transmission medium. For an example, where the light (for which the substrate is being used as an optical transmission medium) is red light having a wavelength of 620 nm, the substrate will be considered a bulk-substrate where the thickness of the substrate (between its major surfaces) is at least 6200 nm, i.e., at least 6.2 µm.

In accordance with certain embodiments, the substrate used as optical element 102 has a thickness of at least 25 µm between its major planar surfaces 168 and 166. In specific embodiments, the substrate has a thickness (between its major surfaces) within a range of 100 µm to 1500 µm, with a likely thickness of about 1000 µm. The substrate may be transparent, meaning that it allows visible light to pass through it.

Figure 6A:
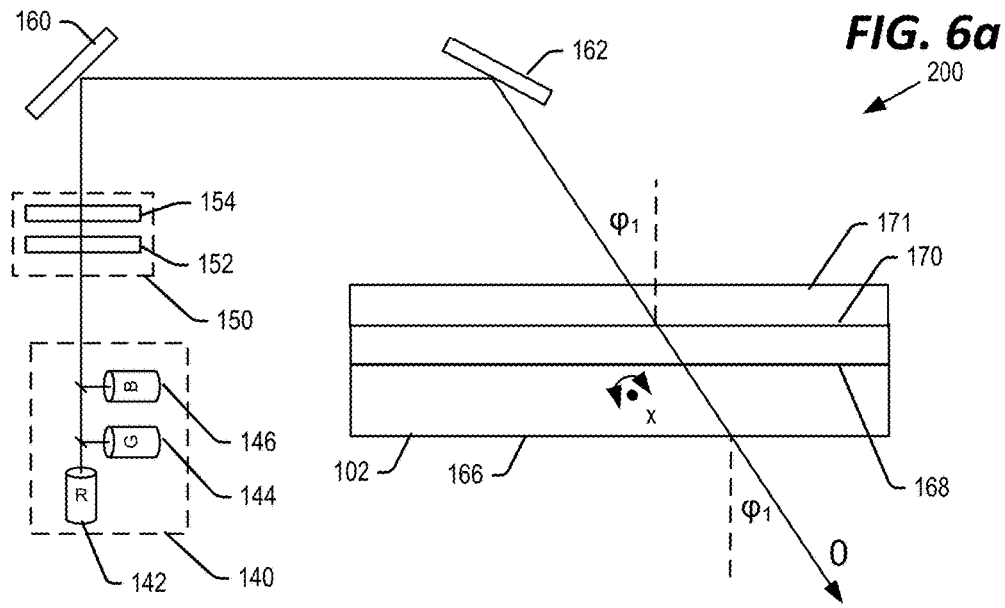
FIG. 6a is a view of a third embodiment of a MEMS Laser scanner showing zero order reflections from the first and second Bragg polarization grating.
Figure 6B:
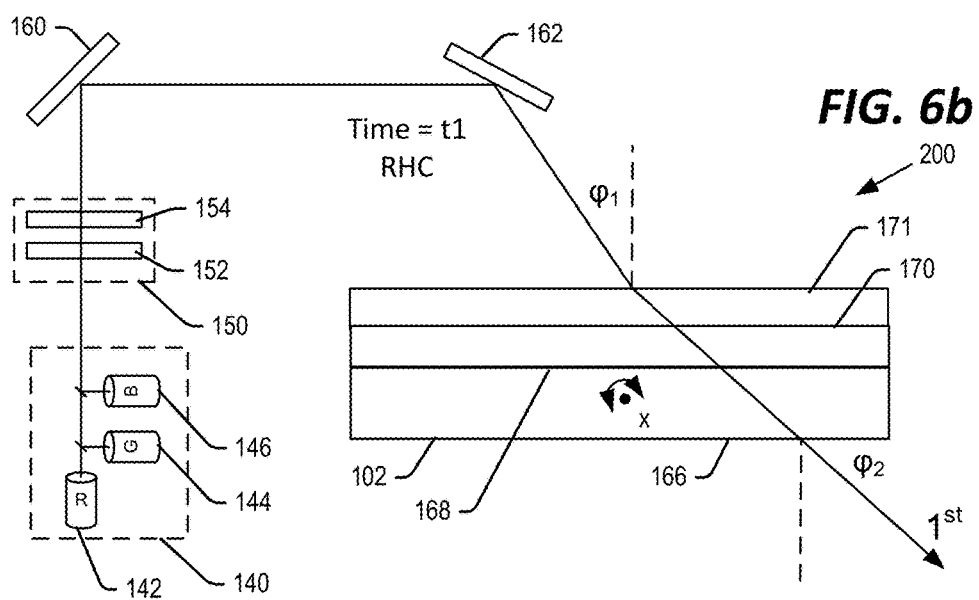
FIG. 6b is a view of a third embodiment of a MEMS laser scanner receiving polarized light at a time t1.
Figure 6C:
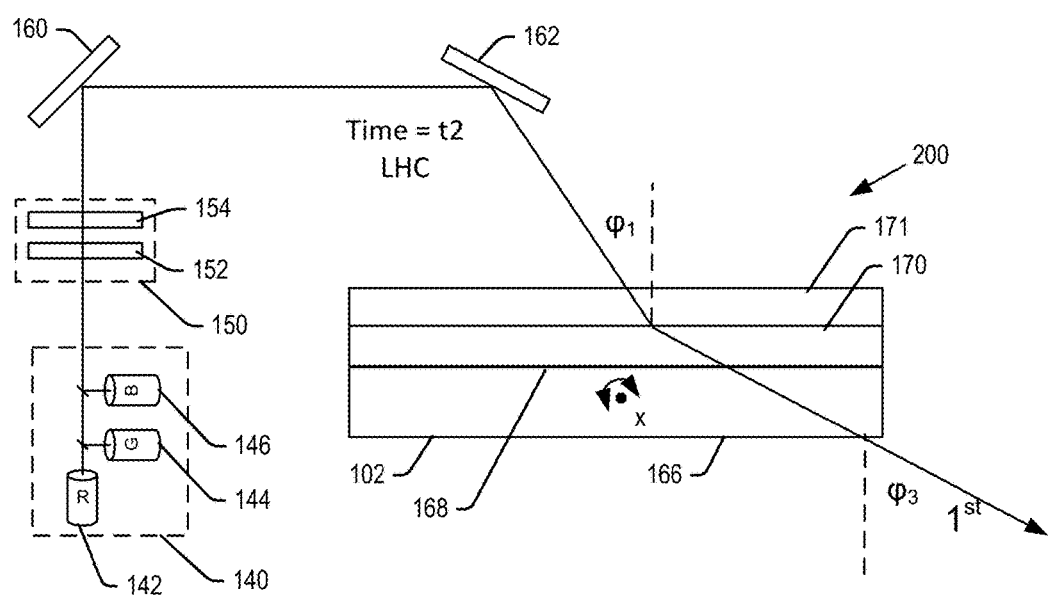
FIG. 6c is a view of a third embodiment of a MEMS laser scanner receiving polarized light at a time t2.

In the embodiment of FIGS. 6a-c, RGB laser light may be generated by the display engine 140, polarized according to a time-division multiplexed scheme by the polarization engine 150, and directed to the optical element by optical components as described above.

FIG. 6a shows light polarized as LHC or RHC light striking the optical element 102 as the optical element pivots about the x-axis. In this diagram, the BPGs 170, 172 are mounted on and pivot with the planar surface 168 of the optical element 102, which as noted above is a transmissive substrate. The forward beam propagates through the BPG unaffected by diffraction for a certain portion of the light. This is the zero order diffraction mode and exists because the diffraction efficiency of the BPG is not 100%. The figure ignores refraction at the air-glass interfaces of 170 to simplify the diagram. The light is incident on the BPG 170 and optical element 102 at some arbitrary angle of incidence, $\varphi_1$, relative to the normal vector to the surfaces of BPG 170 and the surface 168 of optical element 102. In this embodiment, surface 168 is a beam dump in that it is coated with a light absorbing material. The zero order light passes through the BPG 170 unaffected since the direction of the light is outside the angular range of the BPG. This light represents a potential ghost path of unwanted light and should be dumped by for example using an aperture blocking the path while passing display light through.

FIG. 6b shows light polarized as RHC light striking the optical element 102 at some time t1, as the optical element pivots about the x-axis. In this embodiment, the BPG 170 is sensitive to RHC polarized light so that a first order of the RHC polarized light is diffracted. The light is incident on the BPG 170 at the same arbitrary angle of incidence, $\varphi_1$, relative to the normal vector, and is diffracted to an angle, $\varphi_2$, relative to the normal vector. The diffracted light will form a first portion of the image at the output-pupil as explained below.

FIG. 6c shows light polarized as LHC light striking the optical element 102 at some time t2, as the optical element pivots about the x-axis. In this embodiment, the BPG 170 is sensitive to LHC polarized light so that a first order of the LHC polarized light is diffracted. The light is incident on the BPG 170 at the same arbitrary angle of incidence, $\varphi_1$, relative to the normal vector, and is diffracted to an angle, $\varphi_3$, relative to the normal vector. The diffracted light will form a second portion of the image at the output-pupil as explained below.

In embodiments, the desired diffraction angle $\varphi_2$ and $\varphi_3$ of the diffracted ±1 order of light shown in FIG. 6a-6c may be accomplished by controlled selection of the grating thickness(es) of the one or more BPGs, BPG period and refractive index of the one or more BPGs. In further embodiments, the properties of light diffracted through the one or more BPGs 170 may be advantageously controlled by providing a chiral slant to the liquid crystal molecules 174 through a thickness of the sub-layers and across interfaces between the sub-layers. Chiral slanting of liquid crystal molecules is discussed in the above-mentioned Published Patent No. 2016/0033698 to Escuti.

In the embodiments described above, the one or more BPGs 170 allow incident light of the LHC polarized light to diffract to a maximized minus one order, and diffract a maximized plus one order of the RHC polarized light.

Figure 7:
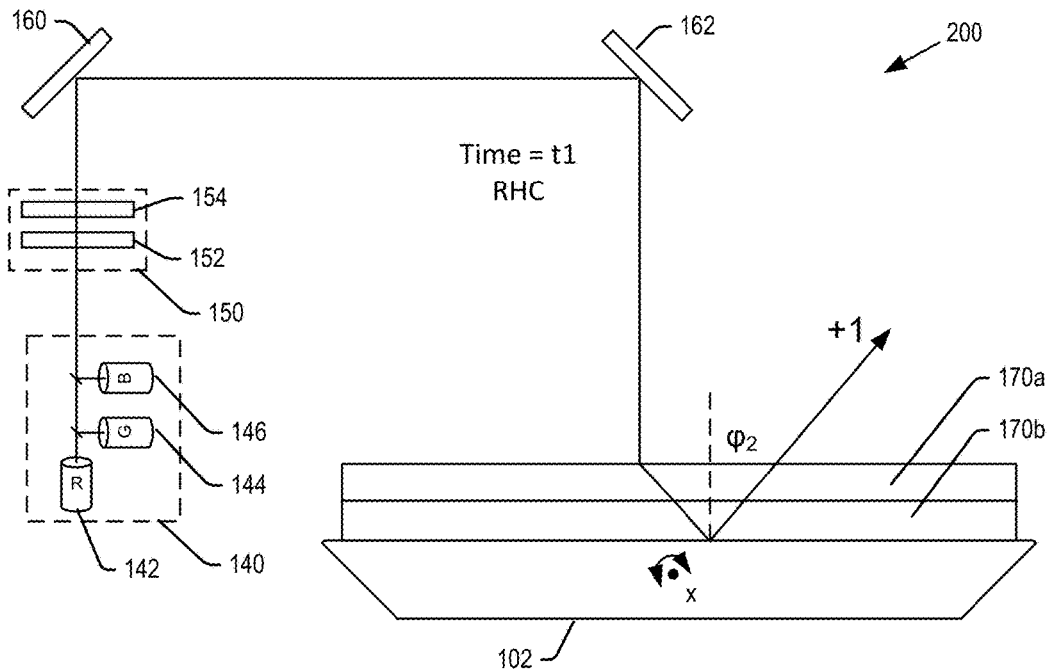
FIG. 7 is a view of a fourth embodiment of a MEMS laser scanner receiving polarized light at a time t1.
Figure 8:
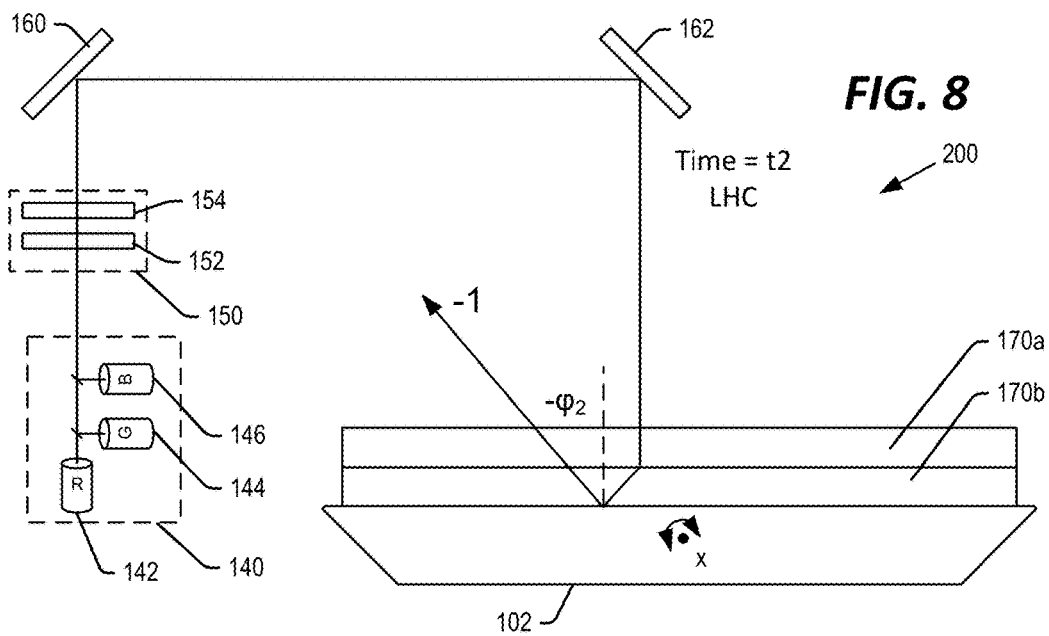
FIG. 8 is a view of a fourth embodiment of a MEMS laser scanner receiving polarized light at a time t2.

FIGS. 7 and 8 illustrate transmissive BPGs 170a, 170b together with a reflective optical element 102. Referring now to FIG. 7, at a first instant in time, t1, RHC polarized light from the polarization assembly 150 may be directed to the optical element 102. The optical element may include a single BPG including regions 170a and 170b as described above. Alternatively, the BPG 170 may comprise separate, stacked BPGs 170a, 170b. The portion 170a is sensitive to RHC polarized light. As such, a +1 order of the polarized light is diffracted in a first direction at a diffraction angle of $\varphi_2$. The light then passes through portion 170b unaffected and reflects off of the mirror surface of the optical element at the reflectance angle (also $\varphi_2$), and propagates back through the portions 170b and 170a to form a first portion of the FOV.

Referring now to FIG. 8, at a second instant in time, t2, LHC polarized light from the polarization assembly 150 may be directed to the optical element 102. The portion 170b is sensitive to LHC polarized light. As such, the LHC polarized light passes through the portion 170a unaffected, and a −1 order of the polarized light is diffracted in a second direction at a diffraction angle of −$\varphi_2$. The light then reflects off of the mirror surface of the optical element at the reflectance angle (also −$\varphi_2$), and propagates back through the portions 170b and 170a to form a second portion of the FOV.

In embodiments, the desired diffraction angles of the +1 and −1 orders may be accomplished by controlled selection of the grating thickness(es) of the one or more BPGs, BPG period and refractive index of the one or more BPGs. In further embodiments, the properties of light diffracted through the one or more BPGs 170a, 170b may be advantageously controlled by providing a chiral slant to the liquid crystal molecules through a thickness of the sub-layers and across interfaces between the sub-layers. As noted above, chiral slanting of liquid crystal molecules is discussed in the above-mentioned Published Patent No. 2016/0033698 to Escuti.

Figure 9:
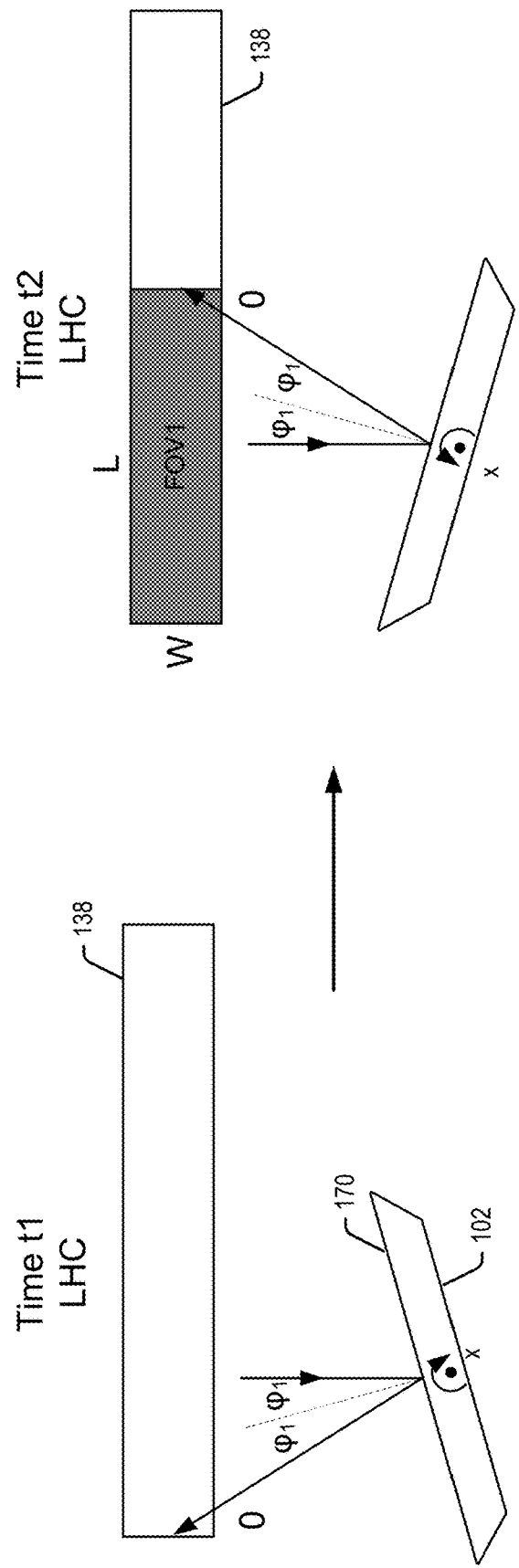
FIG. 9 illustrates the formation of a first portion of the field of view as the optical element pivots about one of its axes while receiving polarized light.
Figure 10:
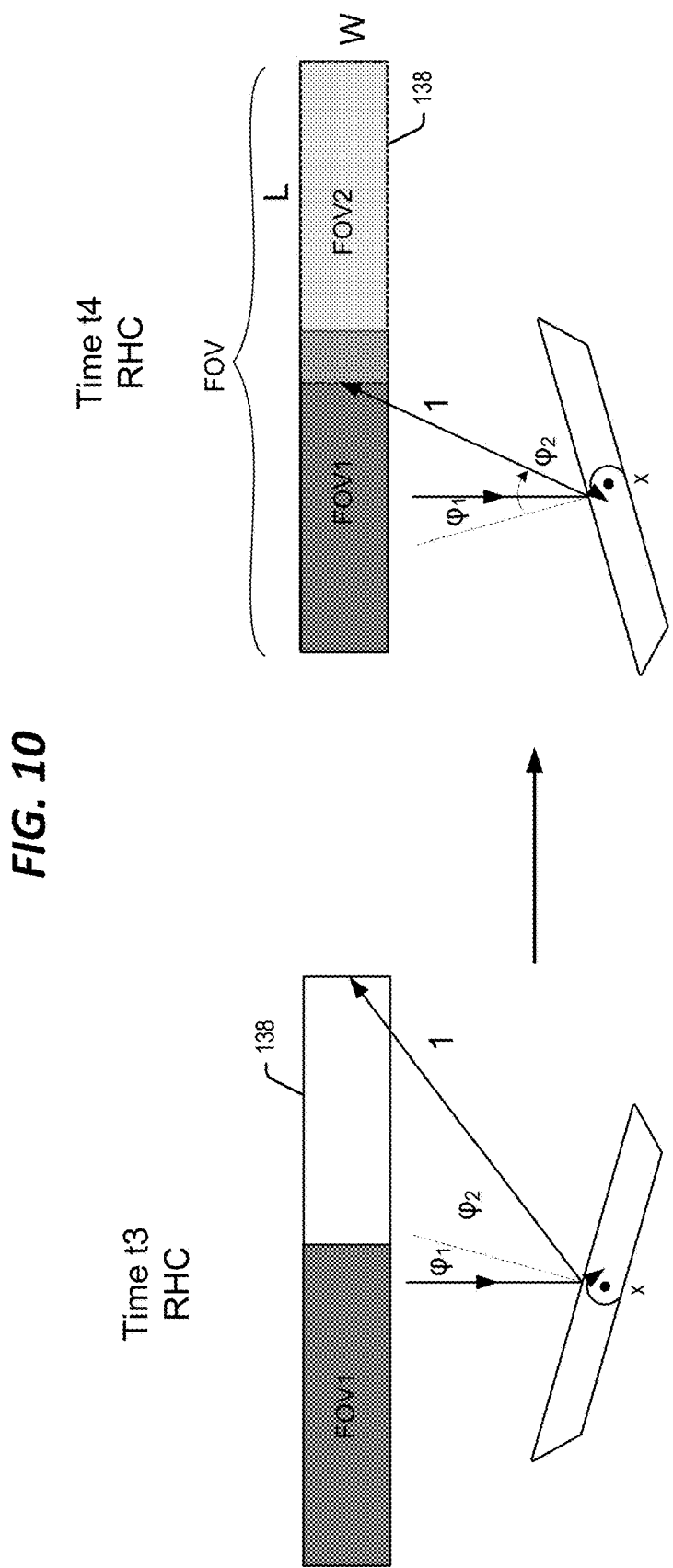
FIG. 10 illustrates the formation of a second portion of the field of view as the optical element pivots about one of its axes while receiving polarized light.
Figure 11:
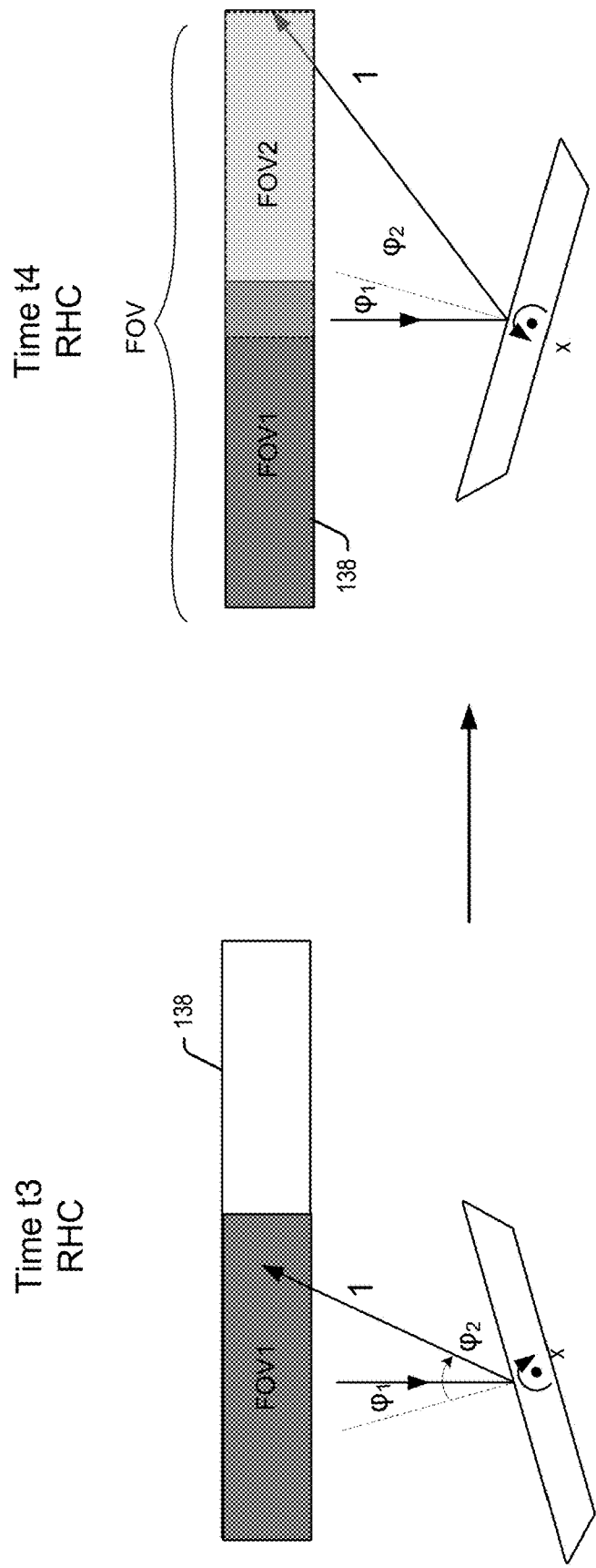
FIG. 11 illustrates an alternative embodiment for the formation of the second portion of the field of view as the optical element pivots about one of its axes while receiving polarized light.
Figure 12:
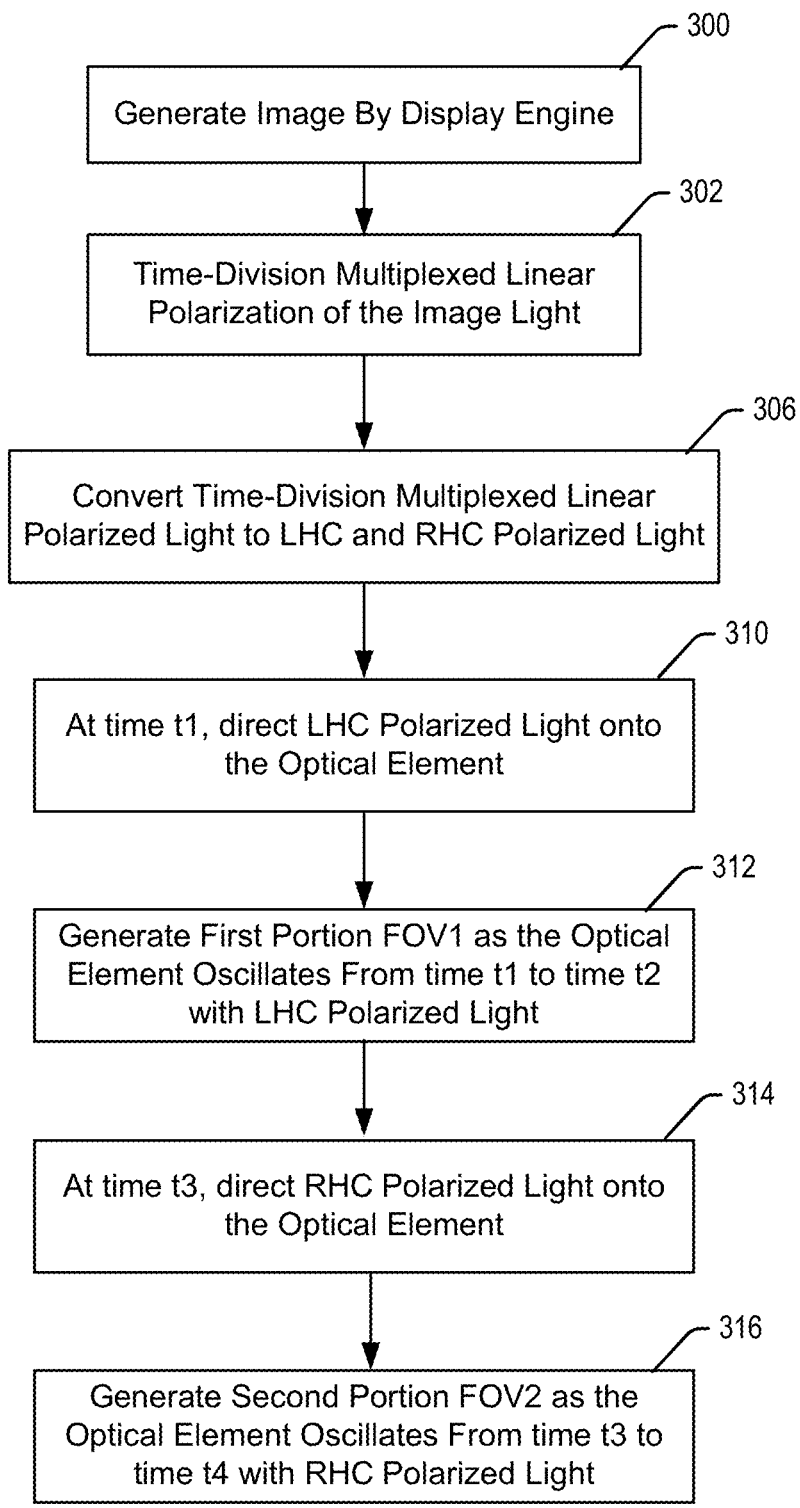
FIG. 12 is a flowchart illustrating the operation of an embodiment of the present technology.

FIGS. 3a-8 illustrate the operation of the optical element 102 including one or more BPGs 170 at discrete instances in time to direct light of different polarizations in different directions. FIGS. 9-11 and the flowchart of FIG. 12 will now be described showing how this feature may be used in a time-division multiplexed scheme to trace out two separate portions of the FOV at the output-pupil over the course of a single period of oscillation of the optical element 102 about one of the axes, e.g., the x-axis. These two FOVs may be combined to provide an enlarged overall FOV as explained below.

FIG. 9 shows an example of tracing out a first portion FOV1 of the overall FOV at the output-pupil 138 over a time period between time t1 and t2. At time t1, light having a first polarization, for example LHC polarization, is directed onto the optical element 102 including the one or more BPGs 170 (step 310). The display engine 140, polarization assembly 150 and optical components for directing the light onto the optical element 102 are omitted from FIGS. 9-11 for ease of understanding.

The BPG 170 in this example is insensitive to LHC polarized light, so the zero order of the polarized light, maximized relative to other orders, passes straight through the one or more BPGs 170 and is reflected at the same angle at which the light is incident on the optical element 102, $\varphi_1$ in this example.

The controller 124 maintains the light polarized as LHC polarized light as the optical element 102 oscillates in step 312 between times t1 and t2. At time t1, the optical element 102 is shown pivoted to its fullest extent in one direction about the x-axis, and at time t2, the optical element 102 is shown pivoted to its fullest extent in the opposite direction about the x-axis. The optical element may pivot over a range of about 30-35 degrees between its fullest extents at times t1 and t2, though it may be other angular ranges in further embodiments.

As the optical element pivots from one extent at time t1 to the opposite extent at time t2 with the light polarized as LHC, the light traces out the first portion FOV1 of the overall FOV at the output-pupil 138. The pivot about the x-axis traces out the length, L, of the FOV1. The high frequency pivot about the y-axis (not shown in FIG. 9) traces out the width, W, of the FOV1. That is, the oscillation about the y-axis traces out each column of pixels in the FOV1 as the oscillation about the x-axis moves across the length of the FOV1. The particular shape of the FOV1 is by way of example only and the aspect ratio of the length L to width W may vary in further embodiments.

FIG. 10 shows the same configuration as FIG. 9, but for tracing out a second portion FOV2 of the overall FOV at the output-pupil 138 over a time period between time t3 and t4. At time t3, which is later than time t2, the optical element 102 has not moved (relative to the x-axis) from its maximum extent position at time t2. Time t3 may for example be an instant in time directly following time t2. However, at time t3, the controller 124 switches the polarization of the light from the polarization assembly 150 so that the light is RHC polarized light at time t3 (step 314).

As explained above, the RHC polarized light is diffracted in a different direction than LHC polarized light. Light coming in at an angle of incidence of $\varphi_1$ relative to the normal diffracts and reflects off of the optical element at an angle of $\varphi_2$, which in this embodiment may be greater than $\varphi_1$. As such, even though the position of the optical element has not changed relative to the x-axis from time t2 to time t3, the light reflects off of the optical element 102 at time t3 in a different direction than at time t2.

At time t3, the optical element 102 is shown pivoted to its fullest extent in one direction about the x-axis, and at time t4, the optical element 102 is shown pivoted to its fullest extent in the opposite direction about the x-axis. The position of the optical element 102 relative to the x-axis at time t4 may be the same as at time t1 in FIG. 9. As the optical element pivots from one extent at time t3 to the opposite extent at time t4 in step 316, the controller 124 maintains the light as RHC polarized, and the light traces out the second portion FOV2 of the overall FOV. The pivot about the x-axis traces out the length, L, of the FOV2. The high frequency pivot about the y-axis (not shown in FIG. 10) traces out the width, W, of the FOV2. The particular shape of the FOV2 is by way of example only and the aspect ratio of the length L to width W may vary in further embodiments.

As can be seen by the depiction at time t4, the optical element including the one or more BPGs 170 has traced out the FOV1 and FOV2 which combine to provide an overall FOV. The above-described operation of FIGS. 9 and 10 may take place once an image frame. After time t4, the controller 124 may again switch the polarization of the light back to LHC polarization, and the process may repeat to generate the next frame of the image. As shown, the FOV1 and FOV2 may overlap, though they may overlap to a greater or lesser extent, or not overlap, in further embodiments.

It is a feature of the present technology that the size of the overall FOV may be substantially increased relative to the same oscillation of a mirror of a conventional MEMS laser scanner. In particular, by including the one or more BPGs 170 and time-division multiplexing the polarization of light to the optical element, light may reflect off of the optical element over a wider range of angles, and the size of the overall FOV may be substantially increased. This increase may be to around 70 degrees, though it may be greater or lesser than that in further embodiments.

In embodiments described above, the one or more BPGs were oriented to diffract light in the length direction of the FOV corresponding to oscillation about the x-axis, and the time-division multiplexed polarization of light was synchronized by the controller 124 to the oscillation about the x-axis. However, in further embodiments, it is understood that the one or more BPGs may be oriented to diffract light in the width direction of the FOV corresponding to oscillation about the y-axis, and the controller 124 may synchronize the time-division multiplexed polarization of light to oscillation about the y-axis.

It is further understood that the controller 124 may synchronize the time-division multiplexing of the polarized light to other periodic oscillations of the optical element 102 about an axis such as the x-axis. For example, FIG. 11 illustrates an alternative to the operation shown in FIG. 10. In the embodiment of FIG. 11, the optical element may trace out the first portion FOV1 of the overall FOV as shown and described above with respect to FIG. 9.

However, in the embodiment of FIG. 11, after time t2, the optical element 102 oscillates back to the same position (home position) that it had at time t1. During this oscillation back to the home position, the controller 124 may down-modulate (turn off) the light from the display engine 140. Once at the home position at time t3, the display engine may emit image light which is polarized as RHC. The optical element 102 may then pivot to its opposite extent from time t3 to time t4 to trace out the second portion FOV2 of the overall FOV. In general, where the embodiment of FIG. 10 traced out the FOV2 right to left, the embodiment of FIG. 11 may trace out the same FOV2 left to right.

Embodiments described above show switching of the polarization of the light incident on the optical element while the optical element is pivoted at its extreme extents. However, it is understood that the controller 124 may synchronize the time-division multiplexing scheme of the polarization assembly 150 with the oscillation of the optical element 102 to switch polarizations at some point between the extreme extents of the optical element. This may take place for example twice per a complete oscillation of the optical element (as in FIGS. 9 and 10) or once per complete oscillation of the optical element (as in FIGS. 9 and 11).

Figure 13:
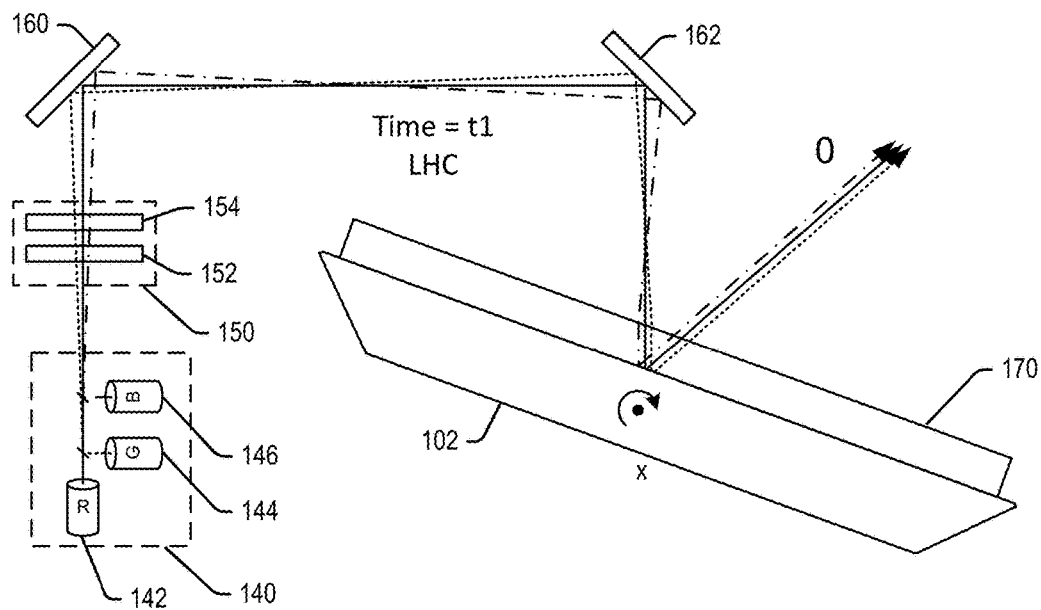
FIG. 13 is a view of an alternative configuration for the MEMS laser scanner according to embodiments of the present technology.
Figure 14:
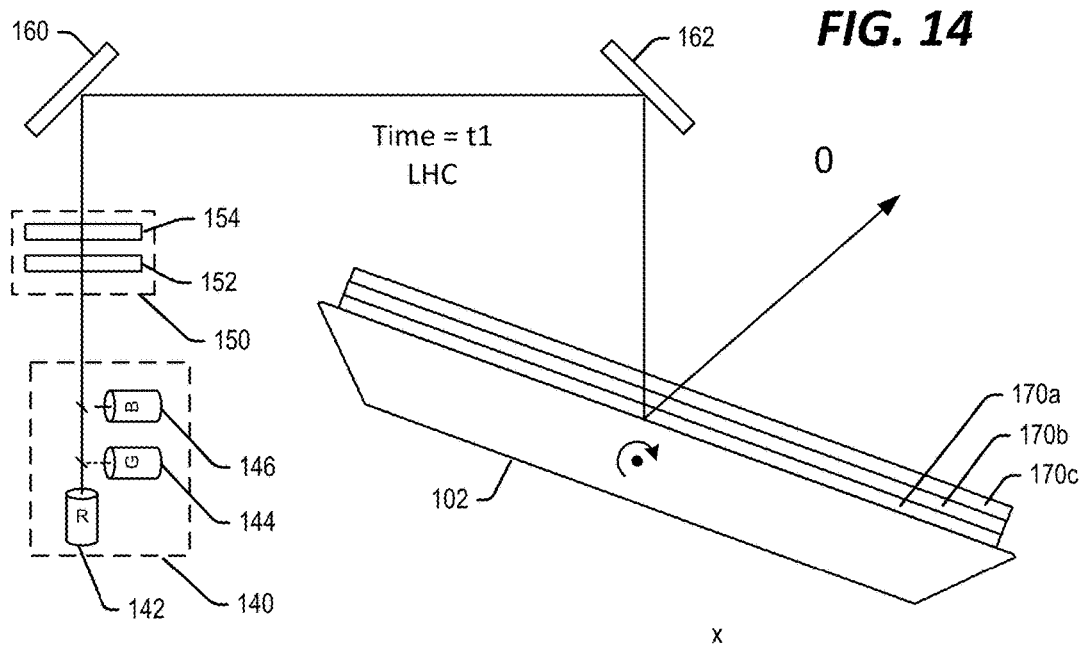
FIG. 14 is a view of a further alternative configuration for the MEMS laser scanner according to embodiments of the present technology.

In embodiments described above, each of the RGB lasers are treated as propagating through the one or more BPGs 170 in the same manner and along parallel paths. However, it may happen that the one or more BPGs 170 propagate and/or diffract light of different wavelengths in different ways. FIGS. 13 and 14 illustrate two embodiments for ensuring that the RGB laser light components are reflected off of the optical element in parallel paths.

In FIG. 13, the RGB laser diodes 142, 144, 146 and/or the optical components within the display engine 140 are provided so that each of the RGB lasers emitted from the display engine 140 are slightly off axis with respect to each other. The degree to which the lasers are off axis with respect to each other is controlled so that, once the RGB lasers pass through the one or more BPGs 170, each will propagate and/or diffract at slightly different angles, and the RGB lasers reflect off of the optical element 102 together and parallel. While the three lasers are shown reflected along different, parallel paths in FIG. 13, this is for illustrative purposes, and the three lasers may combine together when leaving the optical element 102.

FIG. 13 illustrates an example where a zero order of LHC polarized RGB laser light passes through the one or more BPGs 170. It is understood that the embodiment of FIG. 13 would similarly reflect a diffracted first order of RHC polarized RGB laser light together and along parallel paths. Additionally, the off-axis embodiment shown in FIG. 13 could be used where the optical element 102 is a transmissive substrate, as shown for example in FIGS. 6a-c described above.

FIG. 14 shows a further embodiment for compensating for the different propagation and/or diffraction of the different wavelengths of the RGB lasers. In FIG. 14, the one or more BPGs 170 comprise three different BPGs 170a, 170b and 170c. Each BPG 170a, 170b and 170c is tuned to one of the RGB lasers, while allowing the other two of the RGB lasers to pass through unaffected. Each BPG 170a, 170b and 170c is tuned to propagate and/or diffract the wavelength of light to which it is sensitive so that the RGB lasers reflect off of the surface of the optical element 102 together and parallel.

FIG. 14 illustrates an example where a zero order of LHC polarized RGB laser light passes through the BPGs 170a, 170b and 170c. It is understood that the embodiment of FIG. 14 would similarly reflect a diffracted first order of RHC polarized RGB laser light together and along parallel paths. Additionally, the embodiment shown in FIG. 14 could be used where the optical element 102 is a transmissive substrate, as shown for example in FIGS. 6a-c described above.

In embodiments described above, the polarization of light from a single display engine is switched between first and second different polarizations according to a time division multiplexing scheme. In a further embodiment, a first display engine may provide light of a first polarization and a second display engine may provide light of a second polarization orthogonal to the first polarization. In such embodiments, the light from the two different display engines may be incident on the BPGs 170, 171 such as shown in FIGS. 3a, 4a and 6a at the same time. The two different polarizations of light will trace out the two different portions of the FOV as described above.

In summary, an example of the present technology relates to a microelectromechanical (MEMS) scanner, comprising: an optical element capable of one of transmitting light and reflecting light, the optical element supported for pivoting about an axis between first and second positions; and one or more Bragg polarization gratings (BPGs) provided on a portion of the optical element, the one or more BPGs receiving light from one or more display engines, the light polarized into first and second polarizations, the one or more BPGs transmitting the first polarization of light in a first direction and transmitting the second polarization of light in a second direction, the first polarization of light transmitted in the first direction forming a first portion of a field of view (FOV) of the image as the optical element pivots about the axis, and the second polarization of light transmitted in the second direction forming a second portion of the FOV of the image as the optical element pivots about the axis, the second portion of the FOV being different than the first portion of the FOV.

In another example, the present technology relates to a microelectromechanical (MEMS) scanner, comprising: an optical element capable of one of transmitting light and reflecting light, the optical element supported for pivoting about an axis between first and second positions; and one or more Bragg polarization gratings (BPGs) affixed to a portion of the optical element, the one or more BPGs receiving light from one or more display engines, the light polarized into left-handed circular (LHC) and right-handed circular (RHC) polarizations, the one or more BPGs transmitting the LHC polarization of light in a first direction and transmitting the RHC polarization of light in a second direction, the LHC polarization of light transmitted in the first direction forming a first portion of a field of view (FOV) of the image as the optical element pivots about the axis, and the RHC polarization of light transmitted in the second direction forming a second portion of the FOV of the image as the optical element pivots about the axis, the second portion of the FOV being different than the first portion of the FOV.

In a still further example, the present technology relates to a microelectromechanical (MEMS) scanner, comprising: an optical element capable of one of transmitting light and reflecting light, the optical element supported for pivoting about a first axis between first and second positions, and a second axis orthogonal to the first axis; a first actuator for pivoting the optical element about the first axis; a second actuator for pivoting the optical element about the second axis; and one or more Bragg polarization grating (BPGs) affixed to a portion of the optical element, the one or more BPGs receiving an image from an image source, the light from the image polarized into left-handed circular (LHC) and right-handed circular (RHC) polarizations, the one or more BPGs allowing a zero order of one of the LHC and RHC polarizations to pass through in a first direction, and the one or more BPGs diffracting a first order of the other of the LHC and RHC polarizations in a second direction, the light transmitted passing through in the first direction forming a first portion of a field of view (FOV) of the image as the optical element pivots between the first and second positions, and the light transmitted diffracted in the second direction forming a second portion of the FOV of the image as the optical element pivots between the first and second positions, the second portion of the FOV being different than the first portion of the FOV.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A microelectromechanical (MEMS) scanner, comprising:
an optical element configured to pivot about an axis between a first position and a second position; and one or more Bragg polarization gratings (BPGs) provided above a portion of the optical element, the one or more BPGs configured to:
receive polarized light from one or more display engines via a polarizer, wherein the polarized light comprises a first portion of light having a first polarization and a second portion of light having a second polarization; and
transmit the first portion of light in a first direction and transmit the second portion of light in a second direction, wherein the first portion of light transmitted in the first direction forms a first portion of a field of view (FOV) of an image as the optical element pivots about the axis between the first and second positions, and wherein the second portion polarized light transmitted in the second direction forms a second portion of the FOV of the image as the optical element pivots about the axis, the second portion of the FOV being different than the first portion of the FOV.

2. The MEMS scanner of claim 1, wherein the one or more BPGs comprises a first BPG configured to allow a zero order of the first portion of light pass through to diffract a first order of the second portion of light.

3. The MEMS scanner of claim 1, wherein the one or more BPGs is further configured to transmit the first portion of light by diffracting a positive first order of the first portion of light in the first direction, and wherein the one or more BPGs is further configured to transmit the second portion of light by diffracting a negative first order of the second portion of light in the second direction.

4. The MEMS scanner of claim 1, wherein the one or more BPGs is physically separated from the optical element and in a fixed position and orientation.

5. The MEMS scanner of claim 1, wherein the one or more BPGs is provided on a surface of the optical element.

6. The MEMS scanner of claim 1, wherein the optical element and the one or more BPGs form the first portion of the FOV as the optical element pivots from a first position to a second position, and wherein the optical element and the one or more BPGs form the second portion of the FOV as the optical element pivots from the second position to the first position.

7. The MEMS scanner of claim 1, wherein the optical element and the one or more BPGs form the first portion of the FOV as the optical element pivots from a first position to a second position, and wherein the optical element and the one or more BPGs form the second portion of the FOV as the optical element pivots from the first position to the second position.

8. The MEMS scanner of claim 1, wherein the first and the second portions of light come from a single display engine and are time-division multiplexed with each other repeatedly at least once in an image frame.

9. The MEMS scanner of claim 1, wherein the first and second portions of light come from the first and second display engines at the same time.

10. The MEMS scanner of claim 1, wherein the first and second portions of light are left-handed circular polarized light and right-handed circular polarized light, respectively.

11. A microelectromechanical (MEMS) scanner, comprising:
an optical element configured to pivot about an axis between a first position and a second position; and
one or more Bragg polarization gratings (BPGs) provided above a portion of the optical element, the one or more BPGs configured to:
receive polarized light from one or more display engines via a polarizer, wherein the polarized light comprises a first portion of light having a left-handed circular (LHC) polarization and a second portion of light having a right-handed circular (RHC) polarization; and
the first portion of light in a first direction and the second portion of light in a second direction, the first portion of light transmitted in the first direction forming a first portion of a field of view (FOV) of the image as the optical element pivots about the axis between the first and second positions, and the second portion of light transmitted in the second direction forming a second portion of the FOV of the image as the optical element pivots about the axis between the first and second positions, the second portion of the FOV being different than the first portion of the FOV.

12. The MEMS scanner of claim 11, wherein the one or more BPGs is further configured to reflect a zero order of the first portion of light in the first direction and to reflect the second portion of light by diffracting a first order of the second portion of light in the second direction.

13. The MEMS scanner of claim 11, wherein the one or more BPGs is further configured to reflect the first portion of light by diffracting a positive first order of the first portion of light in the first direction and to transmit the second portion of light by diffracting a negative first order of the second portion of light in the second direction.

14. The MEMS scanner of claim 11, wherein the optical element comprises a mirror for transmitting light by reflection.

15. The MEMS scanner of claim 11, wherein the optical element comprises a substrate for transmitting light by propagation of the light through the substrate.

16. The MEMS scanner of claim 11, wherein the LHC and RHC polarizations of light are generated by two separate display engines, or according to a time-division multiplexing scheme from a single display engine.

17. A microelectromechanical (MEMS) scanner, comprising:
an optical element configured to pivot about a first axis between a first position and a second position and a second axis orthogonal to the first axis;
a first actuator for pivoting the optical element about the first axis;
a second actuator for pivoting the optical element about the second axis; and
one or more Bragg polarization grating (BPGs) provided above a portion of the optical element, the one or more BPGs configured to:
receive an image from an image source, the light from the image polarized, by a polarizer, into a first portion of light having a left-handed circular (LHC) polarization and a second portion of light having a right-handed circular (RHC) polarization;
allow a zero order of one of the first portion of light or the second portion of light to pass through in a first direction; and
diffract a first order of the other of the first portion of light or the second portion of light in a second direction, the light passing through in the first direction forming a first portion of a field of view (FOV) of the image as the optical element pivots between the first and second positions, and the light diffracted in the second direction forming a second portion of the FOV of the image as the optical element pivots between the first and second positions, the second portion of the FOV being different than the first portion of the FOV.

18. The MEMS scanner of claim 17, wherein the MEMS scanner is part of a head mounted display for providing an augmented reality environment.

19. The MEMS scanner of claim 17, wherein the optical element comprises a mirror for transmitting light by reflection.

20. The MEMS scanner of claim 17, wherein the optical element comprises a substrate for transmitting light by propagation of the light through the substrate.

* * * * *